United States Patent [19]

Denko

[11] 4,215,400
[45] Jul. 29, 1980

[54] DISK ADDRESS CONTROLLER

[75] Inventor: Masatoshi Denko, Oume, Tokyo, Japan

[73] Assignee: Tokyo Schibaura Electric Co. Ltd. Kawasaki, Japan

[21] Appl. No.: 850,146

[22] Filed: Nov. 10, 1977

[30] Foreign Application Priority Data

Nov. 17, 1976 [JP] Japan ................................ 51-138174

[51] Int. Cl.² ....................... G06F 13/04; G06F 3/06; G06F 7/38
[52] U.S. Cl. ................................................ 364/200
[58] Field of Search ... 364/200 MS File, 900 MS File

[56] References Cited

U.S. PATENT DOCUMENTS

| | | | |
|---|---|---|---|
| 3,368,207 | 2/1968 | Beausoleil et al. | 364/200 |
| 3,461,433 | 8/1969 | Emerson | 364/200 |
| 3,573,855 | 4/1971 | Cragon et al. | 364/200 |
| 3,593,302 | 7/1971 | Saito | 364/200 |
| 3,638,195 | 1/1972 | Brender et al. | 364/200 |
| 3,665,421 | 5/1972 | Rehhausser et al. | 364/200 |
| 3,673,576 | 6/1972 | Donaldson, Jr. | 364/200 |
| 3,710,324 | 1/1973 | Cohen et al. | |
| 3,815,099 | 6/1974 | Cohen et al. | |
| 3,909,799 | 9/1975 | Recks et al. | 364/200 |
| 3,986,170 | 10/1976 | Valassis et al. | 364/200 |
| 3,990,055 | 11/1976 | Henderson et al. | 364/200 |
| 4,014,005 | 3/1977 | Fox et al. | 364/200 |
| 4,017,840 | 4/1977 | Schild et al. | 364/200 |
| 4,028,668 | 6/1977 | Riikonen | 364/200 |
| 4,064,489 | 12/1977 | Babb | 364/200 |
| 4,079,452 | 3/1978 | Larson et al. | 364/200 |

FOREIGN PATENT DOCUMENTS 52-74251 6/1977 Japan .

OTHER PUBLICATIONS

*Microprocessors and Microcomputer*, Wiley-Interscience Publication, Jun. 1976, Branko Soucek, pp. 379-381.
*Microcomputer-Based Design*, John Peatman, McGraw-Hill Book Company, 1977, p. 192.
*M6800 Microprocessor Application Manual*, Motorola Inc., 1975, p. 5-113 to p. 5-117.

*Primary Examiner*—Gareth D. Shaw
*Assistant Examiner*—E. Chan

[57] ABSTRACT

A disk address controller includes: a random access memory for storing the upper and lower limit addresses of the access area of each of processing units which are allotted to a disk unit, and storing the disk address specified by a disk input/output instruction from the processing unit; a read only memory for storing a microprogram corresponding to the disk input/output instruction; a microprocessor for executing the microprogram; disk channel units provided corresponding to the respective disk units; and a direct memory access control unit for performing data transfer with the disk unit via the disk channel. The disk address controller sets up the upper and lower addresses of the area arbitrarily allotted to the disk unit by the processing unit. When the real address which is the sum of the lower limit address and the disk address specified by the disk input/output instruction fed from the processing unit to the disk address controller, falls within the access area, the disk input/output instruction in executed by using the real disk address, while the real disk address exists outside the access area, an error interruption is made into the processing unit.

7 Claims, 6 Drawing Figures

DISK ADDRESS CONTROLLER

BACKGROUND OF THE INVENTION

The present invention relates to a disk address controller and, more particularly, the one for effectively controlling a disk unit commonly used in a plurality of processing units or programs.

In the uniprocessing system, when a single disk unit is used independently by individual programs, it needs a sub-routine program for supervising enbloc the information concerning the disk by software, such as, for example, the physical address input/output control system or the logical address input/output control system. This means that the disk device is necessarily controlled through the program routine. Therefore, the time loss of the overhead considerably deteriorates the efficiency of the computer system.

In the multiprocessing system, when two processors independently execute programs, the area of a main memory unit connected with the multiprocessing system must be properly divided and the resource of an input/output unit must be properly assigned for two processors. In large-scale systems, no problem arises with an arrangement that a plurality of disk units are connected to the system and these disk units connected are allotted to the two processors, respectively. In small scale systems, however, since the area of one disk unit is divided and assigned for the two processors, one processor must be operated constantly taking account of the operation of the other processor. Further, when the system is enlarged with expansion of the capacity of the disk unit, it is necessary to greatly modify the program stored in the disk unit.

SUMMARY OF THE INVENTION

Accordingly, a primary object of the present invention is to provide a disk address controller in which, when a disk unit is used independently by separate programs or processors, the disk is accessible without mutual consideration among the programs or processors.

Another object of the present invention is to provide a disk address controller which may effectively control a disk unit connected to the multiprocessing system or the uniprocessing system.

According to an aspect of the present invention, there is provided a disk address controller connected between a plurality of processing units and a plurality of disk units each being accessible by the plurality of processing units, via a bus and controlling the accesses of the processing units upon receipt of disk output instruction issued from the processing units, comprising: base register means for storing the lower limit address of an accessible area allotted each processing unit to one disk unit; limit register means for storing the upper limit address of the accessible area; means in which, when one of the processing units issues a disk input/output instruction, the disk address specified by the disk input/output instruction and the lower limit address of the base register means corresponding to the processing unit having issued the disk input/output instruction are summed to produce a real disk address; means for comparing the real disk address with the upper limit address of the limit register means corresponding to the processing unit having issued the disk input/output instruction; means in which, when the real disk address is smaller than the upper limit address, the disk input/output instruction is performed by using the real disk address, while, when the real disk address is larger than the upper limit address, an error interruption is made into the processing unit having issued the disk input/output instruction.

Other objects and features of the present invention will be apparent from the following description taken in connection with the accompanying drawings, in which:

DETAILED DESCRIPTION OF THE PREFERRED EMBODIMENTS

Figure 1:
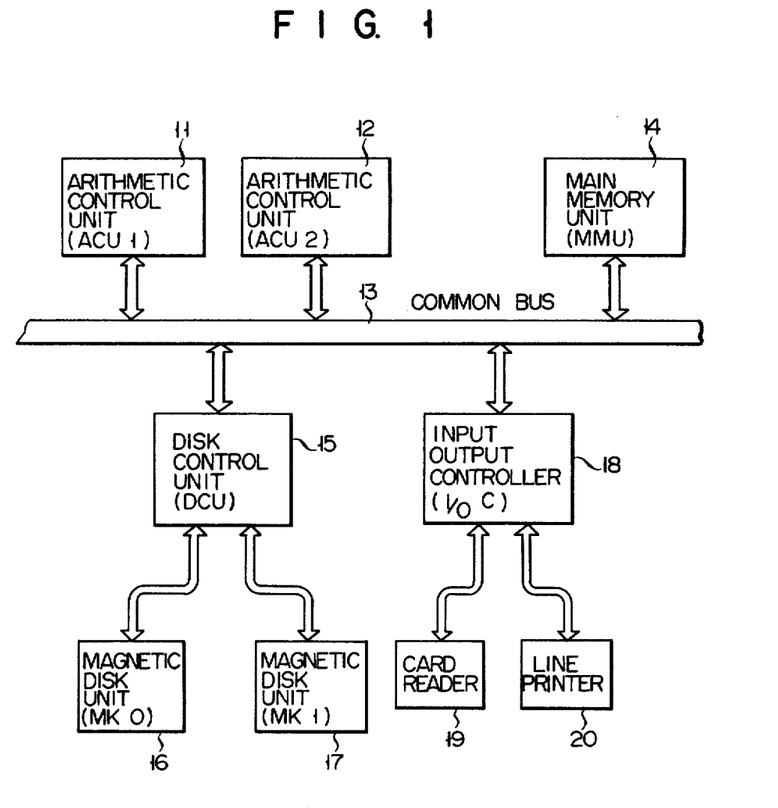
FIG. 1 shows a block diagram of a multiprocessing system using an embodiment of a disk address controller according to the present invention.

Referring now to FIG. 1, there is shown a multiprocessing system using a disk address controller according to the present invention. As shown, two arithmetic control units (ACU) 11 and 12 are connected to a common bus 13 via interface buses and these units generate commands to operate the system and control the calculation to be executed depending on various instructions. A main memory unit (MMU) 14 is also connected to the common bus 13 and stores the input/output information through the common bus line 13. The disk control unit (DCU) 15 is connected to the common bus 13 and is controlled by the ACU's 11 and 12. A plurality of magnetic disk unit (MK) 16 and 17 are connected with the DCU 15 and are controlled by it. The input/output controller (I/O C) 18 is connected to the common bus 13 and controls the input/output unit such as a card reader 19, a line printer or the like.

Figure 2:
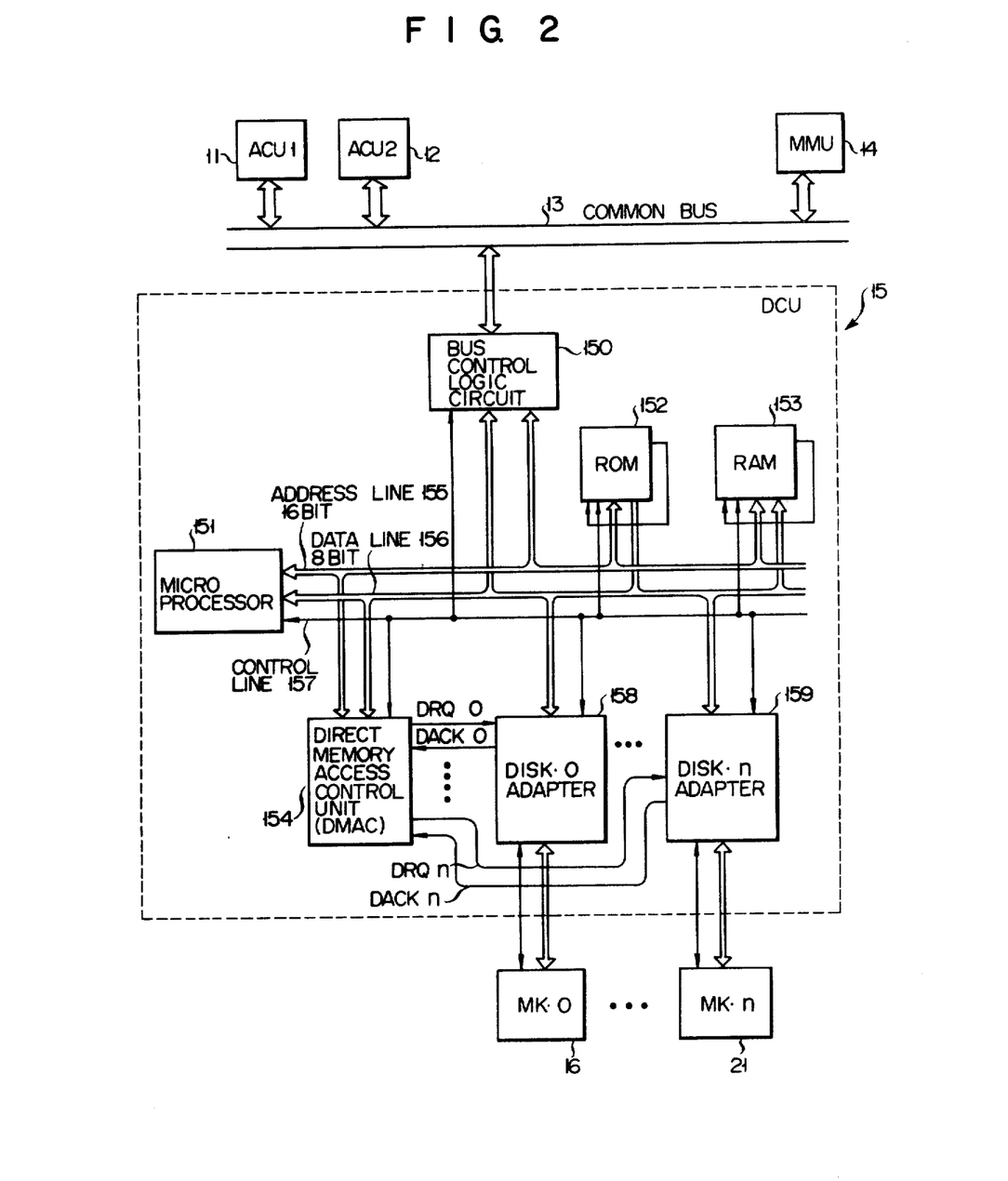
FIG. 2 shows in block form the detail of the disk address controller shown in FIG. 1.

The detailed circuit of the DCU 15 which is essential to the present invention is shown in FIG. 2. A bus control logic circuit 150 is connected to the common bus line 13 and enables the information to transfer between DCU 15 and ACU 11, ACU 12 or MMU 14. The circuit 150 is known as the logic circuit like unibus manufactured by Digital Equipment Corporation (DEC), and is disclosed in the U.S. Pat. No. 3,710,324 entitled DATA PROCESSING SYSTEM. The microprocessor 151 executes disk instructions transferred from the ACU's 11 and 12 to the DCU 15 by using microprograms read out from a read only memory (ROM) 152. The ROM 152 has generally a memory capacity of 8K bytes and stores the microprograms corresponding to the respective DISK instructions. The random access memory (RAM) 153 serves as various functional means in the DCU 15, as will be described in detail later. A direct memory access control unit (DMAC) may be constructed by the 8257 programmable DMA controller manufactured by INTEL corporation, for example. The microprocessor 151, a bus control logic circuit 150, a ROM 152, a RAM 153 and a DMAC 154 are interconnected by common lines, e.g. a 16-bit address line 155, an 8-bit data line 156 and a plurality of control lines 157. Disk adaptors 158 and 159 serve as interface circuits to the magnetic disk units 16 and 17 and are easily constructed by an ordinary interface technique. A number of disk adaptors may be provided corresponding to the number of disk units. The disk adaptors are connected to the corresponding disk units through buses, respectively. More specifically, the disk 0 adaptor 158 is connected to the disk MK-0 16 and the disk n adaptor to the disk MK-n 21. These disk adaptors are further connected to the data line and control lines. The DMAC 154 and the disk units MK 16 to 21 are connected data request lines bearing thereon data request signals DRQ 0 to DRQ n and response lines bearing thereon request affirmative acknowledge signals DACK 0 to DACK n which are permitted in passing therethrough when the request is permitted. The DMAC 154 transfers the data request signals DRQ 0 to DRQ n to the corresponding disk adaptor and then the given information (address and length information) to the disk adaptor from which the request affirmative acknowledge signals DACK 0 to DACK n returns thereto. The given information is applied through the data line 156. Following this, data transfer is made between the given disk MK and the given area of the RAM 153.

Figure 3:
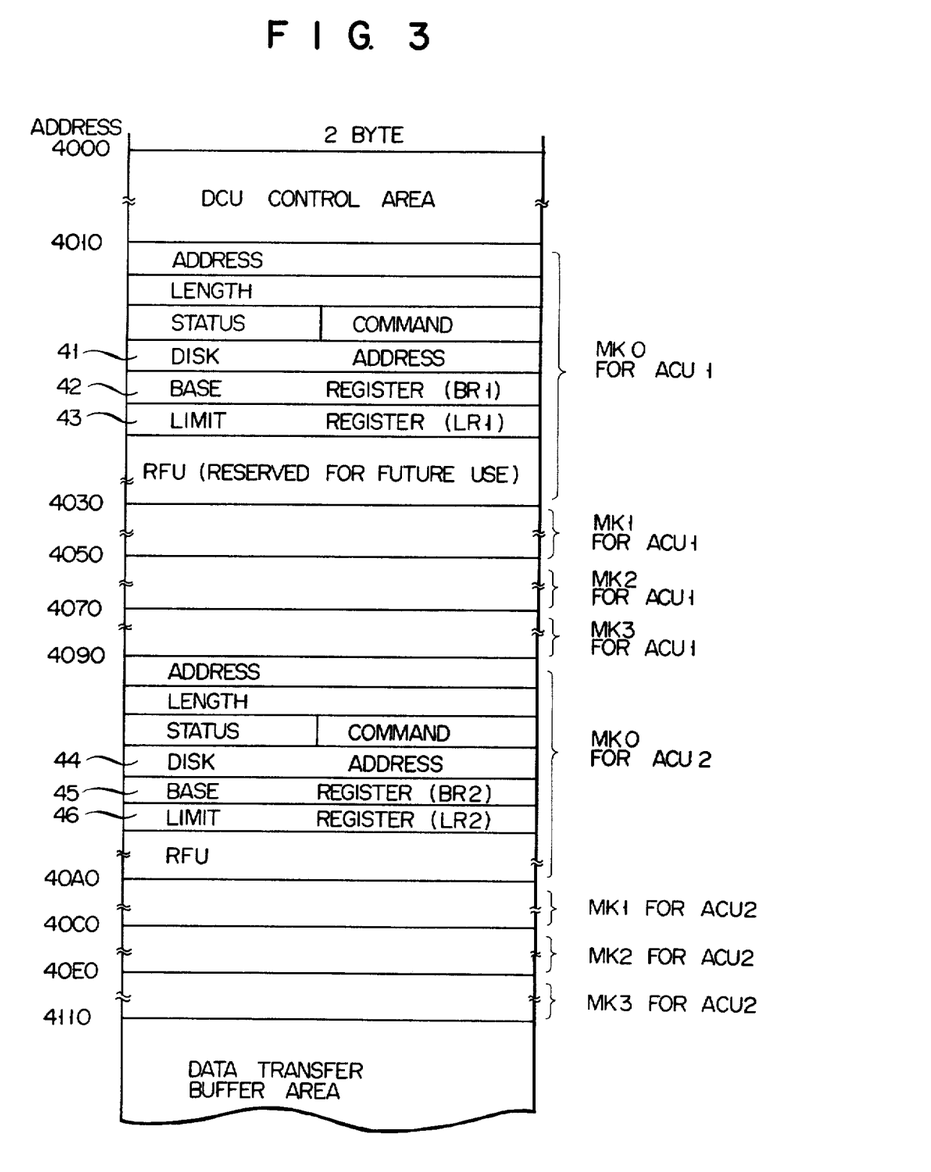
FIG. 3 shows a detailed address table map of a random access memory of the disk address controller shown in FIG. 2.

The RAM 153 includes a talk area for storing the hardware information, i.e. parameters, fed from the ACU's 11 and 12. The table map of this is shown in FIG. 3. The table map relates to the case that two ACU's use four disk units MK No. 0 to No. 3. As shown in FIG. 3, ADDRESS is a start address for loading data transferred from the disk unit MK into the MMU or vice versa. The start address is given from an instruction. LENGTH indicates the transfer length of the transferred data. DISK ADDRESS is given from an instruction and designates the effective address. STATUS designates the error conditions of the disk units. COMMAND means to store only the command code of the I/O command, for example, of the instructions from the ACU. BASE REGISTER (BR 1) and LIMIT REGISTER (LR 1) designate the lower limit address (cylinder address) in the accessible area of the disk unit allotted to the ACU 1 (11) and the upper limit address (cylinder number). Similarly, BR 2 and LR 2 designate the accessible lower limit address and the accessible upper limit address of the same disk unit allotted to the ACU 12. Therefore, the area between the addresses represented by the BASE REGISTER BR and LIMIT REGISTER LR is an access area allotted to the respective ACU's. The area following an address "4110" is a buffer area used for the data transfer between the disk units and the MMU. That is, the data read out from the disk units MK or the main memory MMU are loaded into this buffer area and the data stored in the buffer area are read therefrom and then transferred to the disk unit MK or the main memory MMU.

The disk address controller according to the present invention uses input/output instructions directed to the disk address controller and instructions to define and modify the contents of the BASE REGISTER (BR) and the LIMIT REGISTER (LR). The instruction format of these instructions transferred from the ACU is shown in Table 1.

Table 1

| 0 | 7 | 9 | 11 | 15 | 16 | 23 | 25 | 26 | 39 |
|---|---|---|----|----|-----|----|----|----|----|
| OP | X | U | | CH | I/O COMMAND CODE | | X | | A |

INSTRUCTION FORMAT

In Table 1, the operation code field OP is 8 bits operation code, the field X a 2 bits index modifier, the field U a disk unit No. using 2 bits, the field CH a disk adaptor channel using 4 bits, and the field A is a memory address. The format additionally includes an input/output instruction code of 8 bits. The field A specifies the location address (MSD) of a memory address of 7 bytes consisting of the data area or 2 bytes, the data length of 2 bytes, and header (cylinder, head and sector) of 3 bytes, for example, as shown in Table 2.

Table 2

| MSD | A,A+1 | | A+2,A+3 | A+4,A+5 | A+6 |
|-----|-------|---|---------|---------|-----|
| | X | data area | X | data length | cylinder address | head sector |
| | CPU SET BYTE | | | | |

These input/output instructions relating to the disk are as follows:

Table 3

| | Instructions | Meaning |
|---|---|---|
| 1 | RETURN TO INITIAL POSITION | During execution of a SEEK instruction, when disk error is detected, corrects the head position and returns to the initial position. The instruction is used for resetting the disk unit MK. |
| 2 | SEEK & READ DISK | Requires the data of 7 bytes from the address specified by the field A for the ACU and stores the data transferred to the DCU. With respect to the reading-out of data from the disk unit, the contents of the BASE REGISTER corresponding to the cylinder address is added to the cylinder address. When the result of the addition is smaller than the contents of the LIMIT REGISTER, data is read out from the disk address specified and then are inputted to the address of the main memory specified by the field A, A+1. |
| 3 | SEEK & WRITE DISK | Requires the data of 7 bytes from the address specified by the field A for the ACU and stores the data transferred to the DCU. With respect to the writing of data into the disk unit, the contents of the BASE REGISTER corresponding to the cylinder address is added to |

Table 3-continued

| Instructions | Meaning |
| --- | --- |
| | the cylinder address. When the result of the addition is smaller than the contents of the LIMIT REGISTER, the data from the address of the main memory specified by the field A, A+1 is loaded by the specified length into the specified disk address. |
| 4 SEEK & READ CONTROL FIELD | Requires the data of 7 bytes from the address specified by the field A for the ACU and stores the data transferred into the DCU. Reads out the header byte of the control field from the address of the disk unit specified. The instruction is used for formatting the disk unit surface. |
| 5 SEEK & WRITE CONTROL FIELD | Requires the data of 7 bytes from the address specified by the field A for the ACU and stores the data transferred into the DCU. Writes the header byte into the control field of the address of the disk unit specified. The instruction is used for acknowledging the format on the disk unit surface. |
| 6 STATUS READ | Reads out the error status of the disk system, the DCU and the disk unit MK. More specifically, makes a search of five errors; shake error, timing error, disk error, read error and preamble error. |
| 7 WRITE BASE & LIMIT REGISTER | Sets the disk adaptor and the disk unit and writes the address information of the BASE REGISTER and the LIMIT REGISTER of each ACU specified by the field A. This instruction is used when a predetermined access area of the disk unit is set up. |
| 8 READ BASE & LIMIT REGISTER | Sets machine number of the disk adaptor and the disk unit, reads out the contents of the BASE REGISTER & LIMIT REGISTER of each ACU and stores them into the address of the MMU specified by the field A. The instruction is used when a predetermined access area on the disk unit is seeked. |

The description to follow with reference to FIGS. 1 to 3 is the operation of the disk address controller according to the present invention. Let us consider the case that the ACU 1 (11) issues to the disk unit MK-0 (16) the WRITE BASE & LIMIT REG. instruction, for example, shown in Table 3 in the multiprocessing system shown in FIG. 1. When WRITE BASE & LIMIT REG. instruction of the format shown in Table 1 is fed to the DCU 15 via the common bus 13, the command is loaded into the predetermined area in the table map of RAM 153 shown in FIG. 3 via the data line 156. That is, the address information in the field A in these instructions is stored in the ADDRESS field of the ACU 1 of the disk unit MK-0 16, for example, specified by the field U of the instruction and an I/O command code is stored in the COMMAND field of the ACU 1 of the disk unit MK-0 16. Further, the CH field of the instruction specifies the corresponding channel, for example, the disk-0 adaptor 158. Then, the disk unit and the disk adaptor are specified and the microprocessor 151 is driven to start its operation via the control line 157.

When the microprocessor 151 starts its operation, it reads out a predetermined microprogram from the ROM 152. As previously described, the ROM 152 have stored the microprogram corresponding to each DISK instruction, for example, shown in Table 3. The microprogram causes the microprocessor to perform the input/output instruction relating to the given disk. In other words, the microprocessor 151 decodes the command code stored in the COMMAND field of the RAM 153, by using the microprogram. Upon decoding of the command code, the microprocessor 151 specifies the jump address of the microprogram routine. The jump address information is fed to the bus control logic circuit via the data line 156 and further to the main memory unit MMU 14 via the bus line 13. The address information for the BASE REGISTER and the LIMIT REGISTER of the ACU 1 and those of the ACU 2 are read out from the MMU 14 addressed. Those address information are correspondingly loaded into the BR 1 and LR 1 fields of the ACU 1 in the table map and the BR 2 and LR 2 fields for the ACU 2, under the control of the bus control logic circuit 150. Then, the microprocessor 151 makes an END interruption into the ACU 1 so that the execution of the operation by the microprogram ends. The WRITE & LIMIT REG. instruction sets up the accessible area of the corresponding disk unit MK of the ACU.

An explanation will be given of the case of the SEEK & READ DISK instruction in Table 3.

When this instruction is given from the ACU 1 (11) to the DCU 15, the DCU 15 reads out the information of 7 bytes from the specified address of the MMU 14 and then stores them in the corresponding location of the RAM 153 in the DCU. In other words, the data area information (see Table 2) specified by the A, A+1 bytes is led to the RAM 153 in the DCU 15 and stored it in the ADDRESS field in the table map of the RAM 153. The data length of the A+2, A+3 bytes is loaded into the LENGTH field. The disk address information specified by the A+4, A+5 and A+6 bytes are loaded into the DISK ADDRESS field in the table map. Further, the U field selects the disk unit and the CH field the disk adaptor channel. Then, as in the previous case, the microprocessor 151 in the DCU 15 starts to read out the microprogram corresponding to the SEEK & READ instruction and to execute the operation flow-chart shown in FIG. 4.

Figure 4:
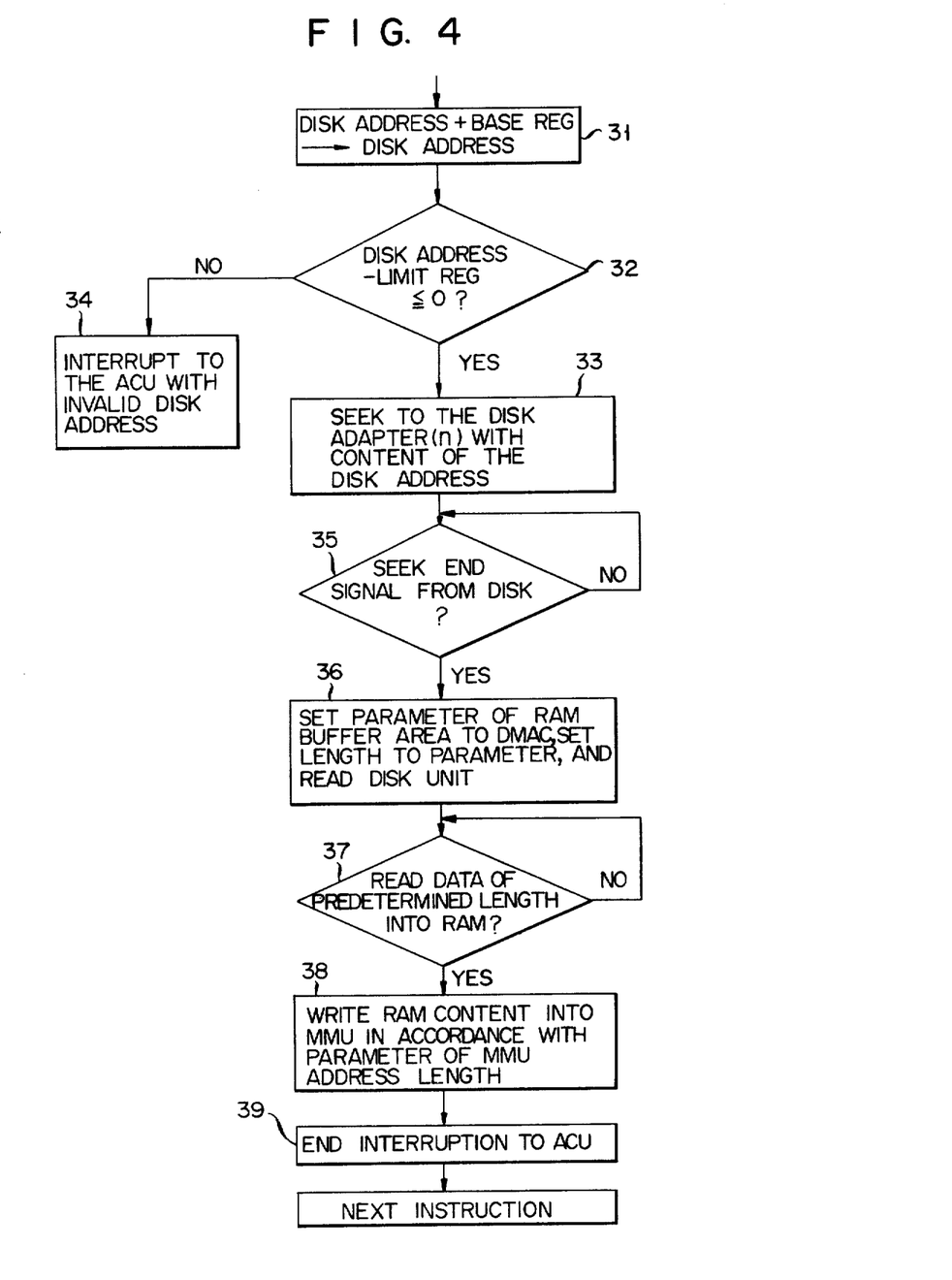
FIG. 4 shows an operational flow chart useful in explaining the disk input/output instruction used in the present invention.

In a step 31, the contents of the DISK ADDRESS field in the RAM 153 is added to the contents of the BASE REG. and the result of the addition is stored in the DISK ADDRESS field. This is a real address for making an access to the disk. This real disk address goes to a step 32 where check is made whether the ACU 1 is accessible to the disk unit MK-0 or not. In other words, the contents of the LIMIT REG. (LR 1) is subtracted from the contents of the DISK ADDRESS (the real disk address) and check is made whether the result of the subtraction is larger or smaller than 0. If the disk address information is smaller than the contents of the LIMIT REGISTER, a step 33 performs a SEEK operation to the DISK ADAPTOR-0 158, by the disk address of the addition result. If the disk address is larger than the contents of the LIMIT REG., the disk address is deemed invalid and then the ACU 1 (11) is interrupted to settle the error. This is made in a step 34.

At the step 33, the SEEK operation is performed and a step 35 checks to see if the seek end signal is fed to the DISK ADAPTOR 158 via the control line from the disk unit MK-0 16. If the check results in NO, the SEEK operation is continued until the seek end signal incomes. If the check result is YES, the operation progresses to enter a step 36. In the step 36, parameter in the data transfer buffer area of the RAM 153 is set in the DMAC 154. And the contents stored in the LENGTH field of the RAM 153 is set as parameter in the DMAC 154. The DMAC 154 supplies a request signal DRQ 0 to the ADAPTOR 158 and the disk unit MK-0 (16) feeds a seek end signal to the ADAPTOR 158 at the step 35. Accordingly, the DISK ADAPTOR 158 quickly feeds back the request permissible signal DACK 0 to the DMCA 154. Therefore, the DMAC 154 reads out data from the real disk address to the disk unit MK-0 (16).

At a step 37, check is made whether or not the data read out from the disk unit MK-0 (16) is stored with a predetermined length in the buffer area of the RAM 153 specified by the parameter in the buffer area stored in the DMAC 154. As a predetermined length of data is read out, the operation under the control of the DMAC 158 ends and the operation advances to the next step 38 where the bus control logic circuit 150 is first controlled in accordance with the microprogram read out from the ROM 152 to the microprocessor 151. Then, the data relating to the disk unit MK-0 (16) stored in the buffer area of the RAM 153 is loaded via the common bus into the predetermined address of the MMU 14 specified by the ADDRESS field of the ROM, in accordance with the parameter with the address length of the MMU 14.

In the succeeding step 39, the microprocessor 151 of the DCU 15 makes an interruption of the end of the SEEK & READ DISK instruction into the ACU 15, through the common bus 13. When the operation at the step 39 is completed, the multiprocessing system executes the next instruction given.

The operation described so far related to the disk instruction shown in Table 3 without taking note of the multiprocessing or the uniprocessing. The description to follow is the disk access operation relating to the abovementioned processings which is a primary feature of the invention.

The multiprocessing will first be given with reference to FIGS. 1 to 5. The disk input/output instruction WRITE BASE & LIMIT REG. fed from the ACU 1 to the DCU 15 sets up the access area of each disk unit MK used by the ACU 1 (11) and ACU 2 (12). For ease of explanation, the example of FIG. 5 employs one disk MK-0. The ACU 1 (11) transfers the WRITE BASE & LIMIT REG. instruction to the DCU 15 via the common bus 13 and, through the above-mentioned operation, the upper and lower limit addresses (cylinder number) of the access area of the disk unit MK-0 which are used by the ACU 1 (11) and ACU 2 (12), respectively, are stored in the BASE REGISTER (BR 1) 42, the LIMIT REGISTER (LR 1) 43, the BASE REGISTER (BR 2) 45 and the LIMIT REGISTER (LR 2) 45 on the table map of the RAM 153.

Figure 5:
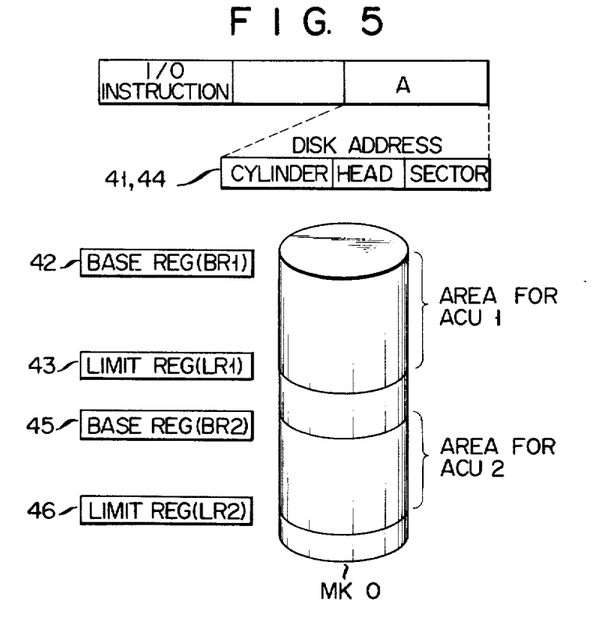
FIG. 5 is a diagram useful in explaining the operation of the disk address controller according to the present invention which is used in the multiprocessing system.

Then, the ACU 1 (11) and the ACU 2 (12) arbitrarily execute the access on the given area by the instructions, such as SEEK & READ DISK, SEEK & WRITE DISK, etc. For example, now if the ACU 2 (12) issues the SEEK & WRITE instruction to the disk unit MK-0, this instruction is executed as in the previous case, except the SEEK & READ instruction and the steps 36 to 38 (FIG. 4). Thus, the explanation to be given is brief. When this instruction is applied from the ACU 2 to the DCU 15, the bus control logic circuit 150 of the DCU 15 detects the ACU from which the instruction is transferred and stores the information read out from the MMU 14 into the respective fields (ADDRESS, LENGTH, DISK ADDRESS) of the corresponding RAM 153. The DISK ADDRESS field 44 stores the cylinder head sector information therein. Then, the microprocessor 151 reads out the microprogram corresponding to this instruction from the ROM 152 and then executes this. That is, the contents of the BASE REGISTER BR 2 is added to the contents of the BASE REGISTER BR 2 (44) in the processor 151. The result of the addition is the real cylinder address of the disk unit MK-0. After this, comparison is made of the addition result with the contents of the LIMIT REGISTER LR 2 (45). If the addition result is smaller than the contents of the LIMIT REGISTER LR 2 (45), the real cylinder address (the addition result) resides within the accessible area and thus the data is read out from the address of the MMU 14 specified by the ADDRESS field of the RAM 153 and successively written them into the address specified of the disk unit MK-0. When the data is written by the data length specified in the LENGTH field of the RAM 153, the processor 151 makes an END interruption into the ACU 2 (12).

If the addition result is larger than the contents of the LIMIT REGISTER 2 (45), the real disk address (the addition result) specifies the other area than the access area and the DISK ADDRESS is deemed invalid and the ACU 2 (12) is interrupted.

Then, the ACU 1 is permitted to apply the SEEK & READ DISK instruction concerning the disk unit MK-0 to the DCU 15. In this manner, the ACU 1 establishes the area accessed by the ACU1 and ACU 2 each disk unit in the BASE REGISTER and the LIMIT REGISTER. And the ACU 1 and ACU 2 arbitrarily access the area defined by the instruction such as the SEEK & READ DISK, the SEEK & WRITE DISK, or the like.

As seen from the foregoing description, in this system, when a plurality of ACU's (processor) use one disk unit with separate programs completely independently, the disk address is identical regardless of the division of the disk unit area, when viewed from the respective programs. As a consequence, the access to the disk unit may be considerably smoothly made.

Incidentally, if the BASE REGISTERs BR 1 and BR 2 have each the value of "0", it is accessible in the manner as of the conventional multiprocessing system.

Figure 6:
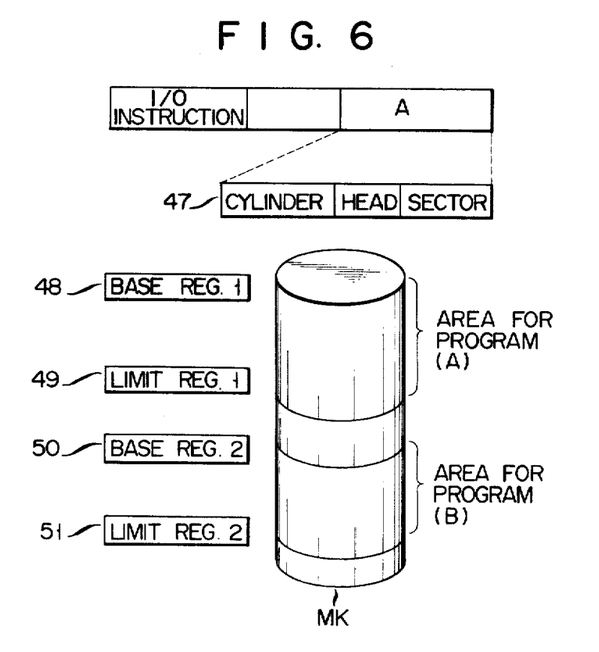
FIG. 6 is a diagram for explaining the operation of the disk address controller according to the present invention which is used in the uniprocessing system.

The case of the uniprocessing system will be made with reference to FIG. 6. This example employs a single ACU. Further, this case is that two programs (A) and (B) use the same disk unit MK and the areas on the file of the program are different. The ACU 1 (11) defines the area to be used by the program (A), by using the BASE & LIMIT REGISTER instruction. The lower and upper limit addresses of the area are stored in the BASE REG. 1 (48) and the LIMIT REG. 1 (49). Then, the ACU 1 (11) defines the area to be used by the program (B), by using the BASE & LIMIT REG. instruction. The upper and lower limit addresses of the area are stored in the LIMIT REG. 2 (51) and the BASE REG. 2 (50). After the definition of the areas to be used by the programs (A) and (B) are completed, the ACU 1 (11) issues the SEEK & READ DISK instruction and the SEEK & WRITE DISK instruction to the DCU 15 to access the programs (A) and (B) areas through the operation as mentioned above. In this case, the relative address from the programs (A) and (B) is set in the DISK ADDRESS field 47. The table map of the RAM 153 is used only by the ACU 1 (11) and the fields of the BASE REG. LIMIT REG., DISK ADDRESS or the like are allotted to the respective programs. In the uniprocessing by this invention, when the disk capacity is extended, it is exchangeable with the conventional program so that there is no need of the modification of program. More particularly, when a plurality of the programs are stored in the disk, and it is desired to substantially independently operate the respective programs, it is sufficed merely by exchanging the value of the BASE REGISTER, without any modification of the programs. Therefore, the efficiency is good. The present invention further is effective to improve the versatility of the software when new computer systems are developed.

What is claimed is:

1. A disk address controller being connected between a plurality of processing units, a main memory, and at least one disk unit being accessible by the plurality of processing units via a bus, and controlling the accesses of the processing units upon receipt of disk output instructions issued from the processing units said disk unit having a storing area including a plurality of accessible area portions allotted to said processing units, respectively, comprising:

base register means for storing the lower limit address of an accessible area portion allotted each processing unit to one disk unit;

limit register means for storing the upper limit address of said accessible area portion;

a direct memory access control unit for executing data transfer between the disk unit and a main memory which are connected to each other via address lines, data lines and control lines;

means in which, when one of the processing units issues a disk input/output instruction, the disk address specified by said disk input/output instruction and the lower limit address of said base register means corresponding to said processing unit having issued said disk input/output instruction are summed to produce an real disk address;

means for comparing said real disk address with the upper limit address of said limit register means corresponding to said processing unit having issued said disk input/output instruction; and means, in which, when said real disk address is smaller than the upper limit address, a command is given to said direct memory access control unit to perform data transfer between the disk unit and said main memory using said real disk address, while, when said real disk address is larger than said upper limit address, an error interruption is made into said processing unit having issued said disk input/output instruction.

2. A disk address controller according to claim 1, further comprising means for executing the operation to set up the upper and lower addresses of accessible area portions in said base register means and said limit register means, upon receipt of an instruction fed from the processing unit.

3. A disk address controller for address-controlling a disk unit accessed by a processing unit and an associated main memory processing a plurality of programs said disk unit having a storing area including a plurality of accessible area portions allotted to said programs, respectively, comprising:

base register means for storing the lower limit address of an accessible area portion allotted each program to one disk unit;

limit register means for storing the upper limit address of said accessible area portion;

a direct memory access control unit for executing data transfer between the disk unit and a main memory which are connected to each other via address lines, data lines and control lines;

means in which, when the processing unit issues a disk input/output instruction by one of said programs, the disk address specified by said disk input/output instruction and the lower limit address of said base register means corresponding to said program are summed to produce a real disk address;

means for comparing said real disk address with the upper limit address of said limit register means corresponding to said program;

when said real disk address is smaller than the upper limit address, a command is given to said direct memory access control unit to perform data transfer between the disk unit and said main memory using said real disk address, while, when said real disk address is larger than said upper limit address, an error interruption is made into the processing unit.

4. A disk address controller according to claim 3, further comprising means for executing the operation to set up the upper and lower addresses of accessible area portions in said base register means and said limit register means, upon receipt of an instruction fed from the processing unit.

5. A disk address controller being connected between a plurality of processing units, a main memory, and a plurality of disk units each being accessible by the plurality of processing units via a bus, and controlling the accesses of the processing units upon receipt of disk input/output instructions issued from the processing units each of said disk units having a storing area including a plurality of accessible area portions allotted to said processing units, respectively, comprising:

bus control means to detect which processing unit has issued said disk input/output instruction and to exclusively use said bus;

random access base register means for storing the lower limit address of an accessible area portion allotted each processing unit to one disk unit;

random access limit register means for storing the upper limit address of said accessible area portion;

random access memory means for storing the parameter information to perform said disk input/output instruction as well;

a read only memory (ROM) for storing a microprogram corresponding to said disk input/output instruction;

a microprocessor for performing the microprogram which corresponds to said disk input/output instruction and is read out from said read only memory;

a plurality of disk channel means connected to said disk units, respectively;

a direct memory access control unit for executing, independently of said microprocessor, data transfer between the disk units and a main memory which are connected to each other by address lines, data lines and control lines;

means for summing, the disk address specified by a disk input/output instruction issued by one of said processing units and the lower limit address of said base register means corresponding to said processing unit having issued said disk input/output instruction to produce an real disk address;

means for comparing said real disk address with the upper limit address of said limit register means corresponding to said processing unit having issued said disk input/output instruction; and means in which, when said real disk address is smaller than the upper limit address, a command is given to said direct memory access control unit to perform data transfer between the disk units and said main memory using said real disk address, while, when said real disk address is larger than said upper limit address, an error interruption is made into said processing unit having issued said disk input/output instruction.

6. A disk address controller according to claim 5, in which said direct memory access control unit includes a circuit giving a data request signal corresponding to said each disk channel means and said disk channel means each include a circuit giving a data transfer acknowledgement signal in response to said data request signal.

7. A disk address controller according to claim 5, in which said random access memory means is allocated to the section for storing the hardware information to each disk unit of each processing unit.

* * * * *